US008250565B2

(12) United States Patent  
Marolia et al.

(10) Patent No.: US 8,250,565 B2
(45) Date of Patent: Aug. 21, 2012

(54) SYSTEM AND METHOD FOR DOWNLOADING UPDATE PACKAGES INTO A MOBILE HANDSET IN A CARRIER NETWORK

(75) Inventors: Sunil Marolia, Dana Point, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2128 days.

(21) Appl. No.: 10/879,869

(22) Filed: Jun. 28, 2004

(65) Prior Publication Data

US 2005/0039178 A1   Feb. 17, 2005

Related U.S. Application Data

(60) Provisional application No. 60/483,552, filed on Jun. 27, 2003.

(51) Int. Cl.
G06F 9/44   (2006.01)

(52) U.S. Cl. ............................................ 717/173

(58) Field of Classification Search .......... 717/168–178; 455/3.05, 418, 426.1, 561, 456.1; 707/4; 370/392; 709/221, 231, 203
See application file for complete search history.

(56) References Cited

U.S. PATENT DOCUMENTS

| 5,261,055 A | 11/1993 | Moran et al. ............. 395/275 |
| 5,442,771 A | 8/1995 | Filepp et al. ............. 395/650 |
| 5,479,637 A | 12/1995 | Lisimaque et al. ......... 395/430 |
| 5,579,522 A | 11/1996 | Christeson et al. ........ 395/652 |
| 5,596,738 A | 1/1997 | Pope ..................... 395/430 |
| 5,598,534 A | 1/1997 | Haas .................. 395/200.09 |
| 5,608,910 A | 3/1997 | Shimakura ............... 395/670 |
| 5,623,604 A | 4/1997 | Russell et al. .......... 395/200.1 |
| 5,666,293 A | 9/1997 | Metz et al. ............ 395/200.5 |
| 5,752,039 A | 5/1998 | Tanimura ................ 395/712 |
| 5,778,440 A | 7/1998 | Yiu et al. ............... 711/154 |
| 5,790,974 A | 8/1998 | Tognazzini ............. 701/204 |
| 5,878,256 A | 3/1999 | Bealkowski et al. ....... 395/652 |
| 5,960,445 A | 9/1999 | Tamori et al. ........... 707/203 |
| 5,974,311 A * | 10/1999 | Lipsit .................. 455/418 |
| 6,009,497 A | 12/1999 | Wells et al. ............. 711/103 |
| 6,038,636 A | 3/2000 | Brown, III et al. ........ 711/103 |
| 6,064,814 A | 5/2000 | Capriles et al. .......... 395/701 |
| 6,073,206 A | 6/2000 | Piwonka et al. .......... 711/102 |
| 6,073,214 A | 6/2000 | Fawcett ................. 711/133 |
| 6,088,759 A | 7/2000 | Hasbun et al. ........... 711/103 |

(Continued)

FOREIGN PATENT DOCUMENTS

CA   2339923   3/2000

(Continued)

OTHER PUBLICATIONS

"Focus on OpenView a guide to Hewlett-Packard's Network and Systems Management Platform", Nathan J. Muller, pp. 1-291, CBM Books, published 1995.

(Continued)

Primary Examiner — Tuan Anh Vu

(57) ABSTRACT

Aspects of the present invention may be seen in a system and method for downloading update packages into an electronic device communicatively coupled to a carrier network. The system may facilitate the update of firmware/software in the electronic device. Different protocols may be utilized for discovery and download of update packages. Also, different protocols may be utilized for provisioning and for subsequent downloading of update packages.

5 Claims, 4 Drawing Sheets

U.S. PATENT DOCUMENTS

| | | | |
|---|---|---|---|
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 * | 3/2001 | Shin et al. | 455/561 |
| 6,279,153 B1 | 8/2001 | Bi et al. | 717/11 |
| 6,308,061 B1 | 10/2001 | Criss et al. | |
| 6,311,322 B1 | 10/2001 | Ikeda et al. | 717/1 |
| 6,438,585 B2 | 8/2002 | Mousseau et al. | 709/206 |
| 6,807,558 B1 * | 10/2004 | Hassett et al. | 709/203 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2002/0184208 A1 * | 12/2002 | Kato | 707/4 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0093545 A1 * | 5/2003 | Liu et al. | 709/231 |
| 2003/0101246 A1 * | 5/2003 | Lahti | 709/221 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | 03/025742 A | 3/2003 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

SYSTEM AND METHOD FOR DOWNLOADING UPDATE PACKAGES INTO A MOBILE HANDSET IN A CARRIER NETWORK

RELATED APPLICATIONS

This patent application makes reference to, claims priority to and claims benefit from U.S. Provisional Patent Application Ser. No. 60/483,552, entitled "System and Method for Downloading Update Packages into a Mobile Handset in a Carrier Network," filed on Jun. 27, 2003.

The complete subject matter of the above-referenced U.S. Provisional Patent Application is hereby incorporated herein by reference, in its entirety. In addition, this application makes reference to U.S. patent application Ser. No. 10/754,313, entitled "Mobile Services Network for Update or Firmware/Software in Mobile Handsets," filed Jan. 9, 2004, U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Electronic devices may use update packages containing information necessary to update firmware/software in electronic devices. Update packages may be downloaded into handsets such that their software or firmware could be updated. It is desirable that the download be efficient and be conducted when convenient to the user. If updating the mobile handset involves interaction with various servers in a carrier network, it may not be appropriate to employ the same protocol for all such interactions. As a result, there is a need to use appropriate protocols for the different types of interactions between a mobile handset and one or more server in the carrier network.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that facilitates the updating of firmware in an electronic device, using updating information received through a network. The system may comprise at least one electronic device having firmware, and being able to be communicatively coupled to a server to download firmware updating information. The system may determine when the at least one electronic device is to be communicatively coupled to the server to download the updating information.

The system may also comprise device information used in identifying the updating information for the at least one electronic device, wherein the system may utilize the device information to determine when the at least one electronic device is to be communicatively coupled to the server to download the updating information. In an embodiment of the present invention, the server may be one of a management server and a delivery server.

The system may further comprise a first protocol utilized by the at least one electronic device to communicate with the management server, and a second protocol utilized by the at least one electronic device to communicate with the delivery server. The system may be capable of causing the at least one electronic device to be communicatively coupled to the management server first, and then to the delivery server to download the updating information. In an embodiment of the present invention, the first protocol may comprise the SyncML DM protocol, and the second protocol may comprise the Open Mobile Alliance Download OTA protocol.

In an embodiment of the present invention, the at least one electronic device may employ the first protocol to communicate the device information to the management server, and the second protocol to download the updating information from the delivery server based on the device information.

In an embodiment of the present invention, the device information may comprise manufacturer identification, model identification, and a firmware version. In another embodiment of the present invention, the device information may comprise manufacturer identification, model identification, a first firmware version, and a second firmware version. In yet another embodiment of the present invention, the device information may comprise manufacturer identification, model identification, a first firmware version, and a firmware version of an application.

Another aspect of the present invention may be seen in an electronic device that employs a first protocol to interact with a first server to determine the existence of updating information for updating the electronic device, and employs a second protocol to retrieve the updating information from a second server if the first server indicates the existence of the updating information in the second server. In an embodiment of the present invention, the first server may comprise a management server.

In an embodiment of the present invention, the electronic device may communicate device information to the first server, and may receive from the first server information identifying a second protocol and a remote reference to employ for the download of updating information. The electronic device may communicate to the first server the device information and an indication of a download protocol supported by the electronic device as the second protocol.

In an embodiment of the present invention, the electronic device may employ a first protocol to communicate the device information to the first server and in response, may download the updating information from the first server employing the first protocol The method of operating a management server interacting with an electronic device employing a management protocol, may comprise receiving device information from the electronic device; processing the device information to determine whether updating information exists for updating firmware or software in the electronic device; and communicating location and protocol information to the electronic device to enable the electronic device to download the updating information employing the location information and the protocol information.

In an embodiment of the present invention, the management server may communicate a universal resource locator (URL) comprising the location and the protocol information to the electronic device.

In an embodiment of the present invention, the method may also comprise instructing the electronic device to employ one of a first protocol and a second protocol to download the updating information based on the device information.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to downloading updates of firmware/software components in electronic devices such as, for example, mobile handsets from a server, and specifically to the use of protocols that make such downloads possible. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
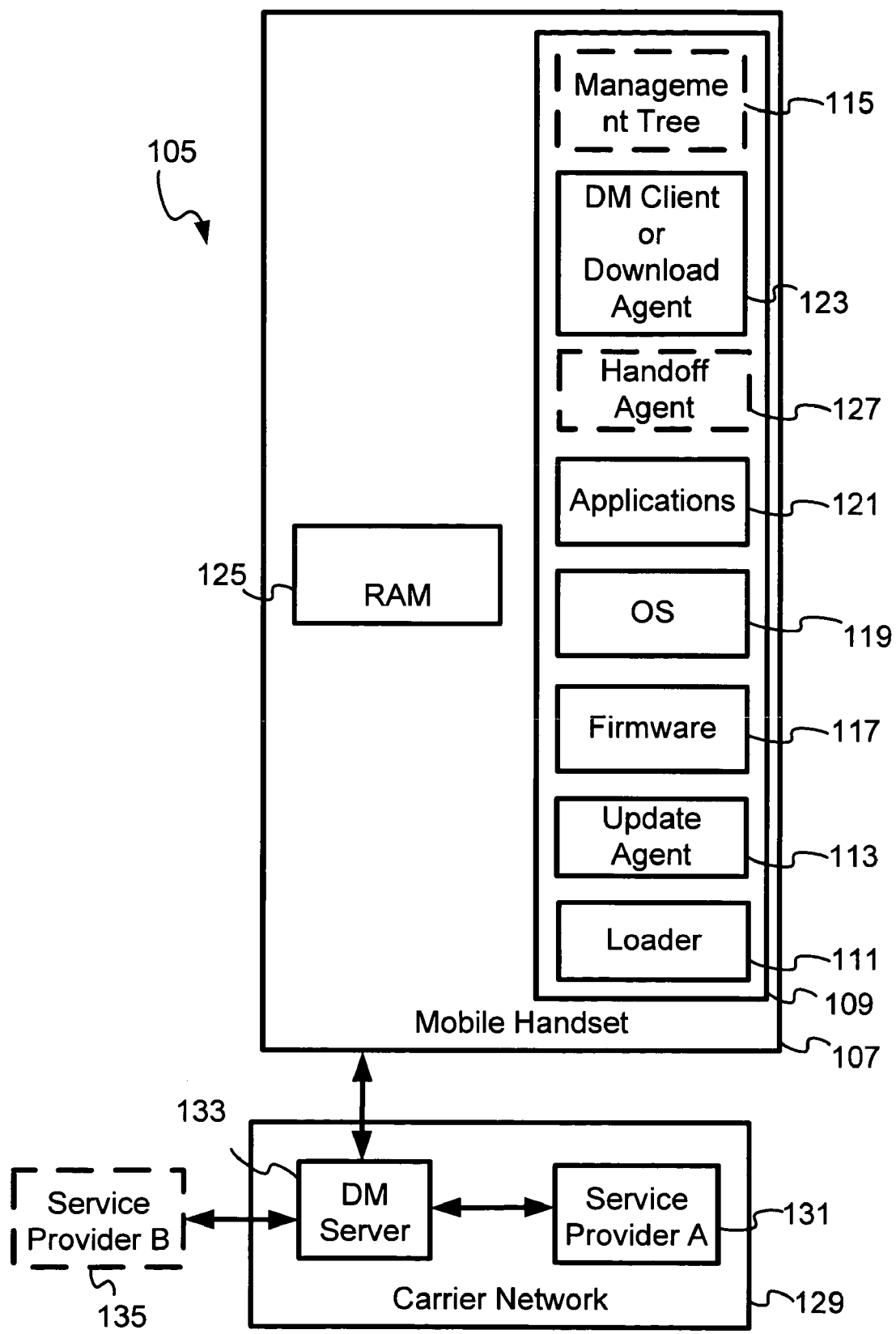
FIG. 1 illustrates a block diagram of an exemplary update system for downloading firmware/software updates in a mobile handset, in accordance with an embodiment of the present invention.

FIG. 1 illustrates a block diagram of an exemplary update system 105 for downloading firmware/software updates in a mobile handset 107, in accordance with an embodiment of the present invention. An update package for an electronic device such as, for example, mobile handset 107 may comprise executable instructions used to convert firmware/software in the mobile handset 107 from one version to another. In an embodiment of the present invention, the update system 105 may comprise the mobile handset 107 communicatively coupled to a carrier network 129.

The carrier network 129 may comprises a device management (DM) server 133 and a service provider A 131. In an embodiment of the present invention, the carrier network 129 may also comprise an external service provider B 135, which may be external to the carrier network 129.

In an embodiment of the present invention, the mobile handset 107 may comprise a random access memory (RAM) unit 125 and a non-volatile memory 109. The non-volatile memory 109 may have a plurality of components such as, for example, a loader 111, an update agent 113, firmware 117, an operating system (OS) 119, applications 121, and a DM client/download agent 123. In an embodiment of the present invention, the non-volatile memory 109 may also comprise a management tree 115 and a handoff agent 127.

In an embodiment of the present invention, the system 105 may provide access to the mobile handset 107 from service providers that are either internal to the carrier network 129 such as, for example, the service provider A 131, or external to the carrier network 129 such as, for example, the service provider B 135.

In an embodiment of the present invention, the DM server 133 may facilitate access to the mobile handset 107 by service provider A 131 and service provider B 135 for provisioning software/firmware downloads and managing the components in the mobile handset 107. In an embodiment of the present invention, the DM server 133 may facilitate the creation and management of managed objects in the mobile handset 107. The managed objects may be arranged in a data structure such as, for example, the management tree 115. In an embodiment of the present invention, the DM client/download agent 123 in the mobile handset 107 may facilitate access to managed objects in the management tree 115.

The applications 121, the OS 119 and the firmware 117 may access managed objects by interacting with the DM client 123. In another embodiment of the present invention, the applications 121, the OS 119 and the firmware 117 may access managed objects without using the DM client 123. The DM client/download agent 123 may be capable of storing information in the management tree 115, as well as in other locations in the non-volatile memory 109, or RAM 125, of the mobile handset 107. The stored information may be subsequently retrieved by an update agent 113 or by other components in the mobile handset 107.

In an embodiment of the present invention, the managed objects in the management tree 115 may represent hardware or software components including, for example, provisioning parameters and configuration parameters, that may be set remotely from the DM server 133, or that may be created and manipulated remotely from the DM server 133. In an embodiment of the present invention, the DM server 133 and the mobile handset 107 may employ protocols such as, for example, a SyncML DM protocol to manage the management tree and the other components in the mobile handset 107. In another embodiment of the present invention, the DM client 123 and the DM server 133 may communicate using transport protocols such as, for example, the SyncML DM protocol to facilitate device management of the mobile handset 107. Further details of the SyncML DM protocol, management tree, and managed objects may be found in the documents "SyncML Device Management Tree and Description, Version 1.1.1", Oct. 2, 2002, and "SyncML Device Management Standardized Objects, Version 1.1.1", Oct. 1, 2002, by the SyncML Initiative, Ltd., the entire subject matter of each of which is hereby incorporated herein by reference, in its entirety.

In an embodiment of the present invention, the service provider A 131 may employ SyncML DM protocols to provision configuration parameters and other parameters into the mobile handset 107 such as, for example, during configuration or provisioning of a new handset by the carrier network 129. The service provider A 131 may employ a different protocol such as, for example, the OMA (Open Mobile Alliance) download protocol for downloading large content such as, for example, large update packages into the mobile handset 107. Further details of the OMA download protocol may be found in the document.

In an embodiment of the present invention, the service provider A 131 may be associated with a unique service subscribed to by the mobile handset 107. The service provider A 131 may be associated with specific management parameters, configuration information, subscriber information and/or an application 121 in the mobile handset 107. The service provider A 131 may employ one or more appropriate managed objects to represent such information, and each of these may be uniquely addressable as managed objects that are part of the management tree 115. For example, the service provider A 131 may provision the universal resource identifier (URI) or universal resource locator (URL) of the service provider B 135, during provisioning of the mobile handset 107 when a user newly acquires the handset. Such provisioning information may end up as a managed object in the management tree 115. The mobile handset 107 may subsequently initiate the download of an update package directly from the service provider B 135 (with or without employing the services of the DM server 133), and may employ the DM client/download agent 123 to download an associated update package. The mobile handset 107 may then store the downloaded update package in non-volatile memory 109. In an embodiment of the present invention, the mobile handset 107 may elect not to employ the management tree 115 as a destination for the downloaded update package.

In an embodiment of the present invention, provisioning of a newly acquired mobile handset 107 by an end-user, by the DM server 133, or by a service provider such as, for example, service provider A 131, may be accompanied by communicating mobile handset 107-related information to service provider B 135. Service provider B 135 may include end-user, subscription-related information, where service provider B 135 may be capable of scheduling or initiating the subsequent transfer of firmware/software update packages to the mobile handset 107. The service provider B 135 may send a notification to the newly provisioned mobile handset 107 that may notify the mobile handset 107, or the user of the mobile handset 107, to initiate the download of one or more update packages so as to conduct an update of available firmware/software, incorporation of new software, or reconfiguration of specific parameters in the mobile handset 107.

Figure 2:
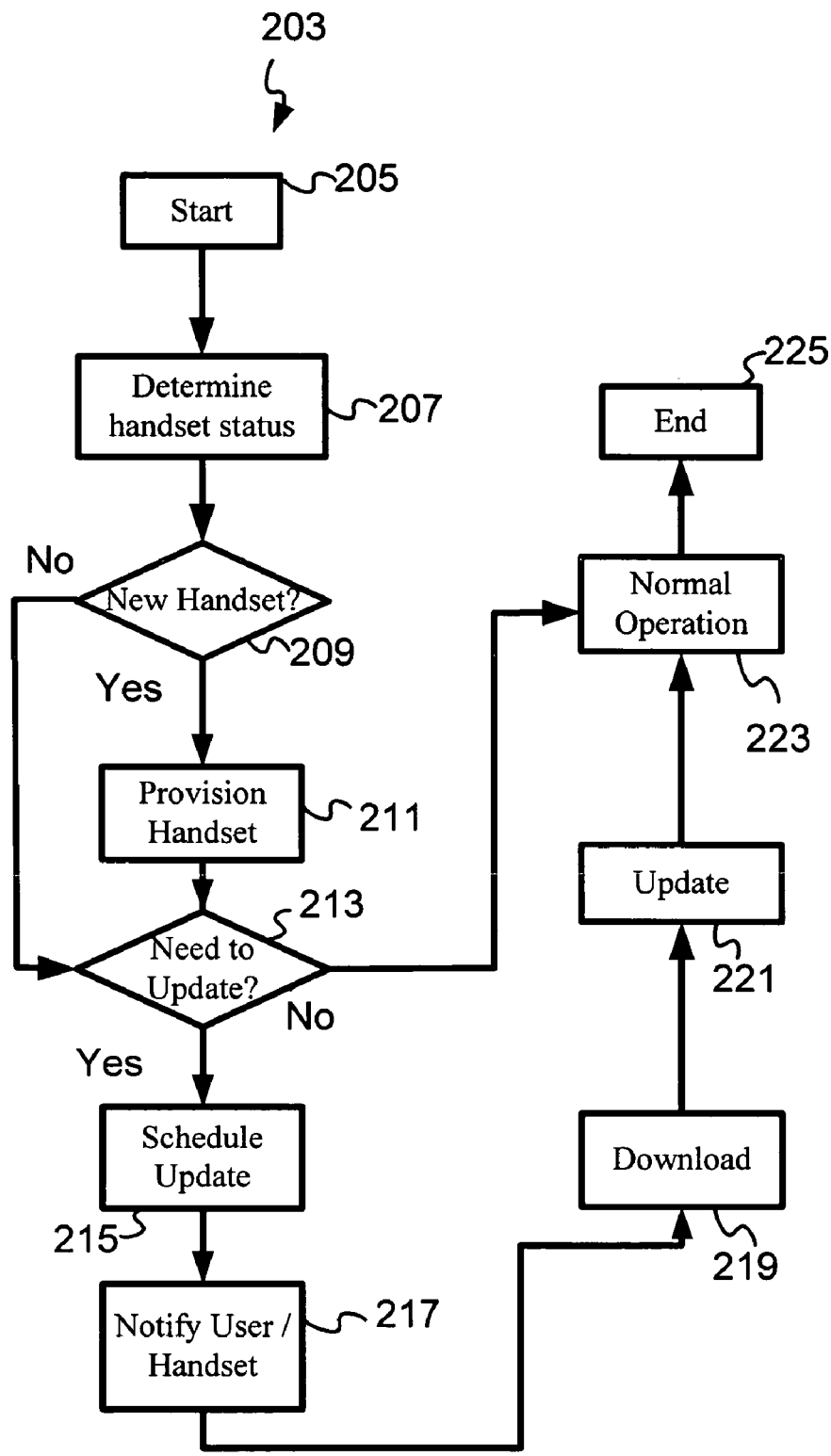
FIG. 2 illustrates a flow diagram of an exemplary operation of an update system for downloading firmware/software updates in a mobile handset, in accordance with an embodiment of the present invention.

FIG. 2 illustrates a flow diagram of an exemplary operation of an update system for downloading firmware/software updates in a mobile handset, in accordance with an embodiment of the present invention. The update system may be such as, for example, the update system 105 of FIG. 1. Processing may begin at a start block 205, when the mobile handset 107 is powered up or comes into the vicinity of the carrier network 129. At a next block 207, the carrier network 129 may determine the status of the mobile handset 107. For example, the subscription of the user of the mobile handset 107 may be verified. At a next decision block 209, it may be determined whether the mobile handset 107 is a new one, i.e. being used for the first time. In an embodiment of the present invention, the determination may be made by the mobile handset 107. In another embodiment of the present invention, the carrier network 129 may make such determination by employing data available in customer care databases, in service providers, or in other systems.

If, at the decision block 209, it is determined that the mobile handset 107 is a new one, i.e. being used for the first time within the carrier network 129, then, at a next block 211, the mobile handset 107 may be provisioned with configuration parameters, network parameters, security codes, etc., as necessary. Then, at a next decision block 213, it may be determined whether the mobile handset 107 requires additional software, bug fixes, updates to firmware/software, etc.

If, at the decision block 209, it is determined that the mobile handset 107 is not a new one, but a known one, then at a next decision block 213, it may be determined whether the mobile handset 107 requires additional software, bug fixes, updates to firmware/software, etc.

If, at the decision block 213 it is determined that no updates, additional software, bug fixes, updates to firmware/software, etc., are necessary, then at a next block 223, the normal operation of the mobile handset 107 may be started before finally terminating at an end block 225.

If, at the decision block 213, it is determined that the mobile handset 107 may require updates, additional software, bug fixes, updates to firmware/software, etc., then, at a next block 215, such updates may be scheduled. In an embodiment of the present invention, service provider B 135 may be capable of providing such update packages to the mobile handset 107. Service provider B 135 may be also capable of scheduling the download of update packages and of sending notification to the mobile handset 107 to initiate such downloads. Then, at a next block 217, the user of the mobile handset 107 may be notified of the need to update the firmware/software in the mobile handset 107. In an embodiment of the present invention, the DM server 133 may schedule download of update packages by the mobile handset 107 from service provider B 135.

At a next block 219, the mobile handset 107 may initiate the download of one or more update packages. In an embodiment of the present invention, the mobile handset 107 may initiate the download based on a schedule of downloads communicated to the mobile handset 107 by the carrier network 129. In another embodiment of the present invention, the mobile handset 107 may receive a notification for download at a scheduled time in response to which the mobile handset 107, or the associated user, may initiate the download of one or more update packages. In an embodiment of the present invention, the update package(s) may be pushed to the mobile handset 107 by the DM server 133 or service provider B 135, based on a schedule or a queue of download commands maintained for download by the mobile handset 107.

Then, at a next block 221, the update agent 113 may update the firmware/software in the mobile handset 107 using the downloaded update package(s). At a next block 223, the normal operation of the mobile handset 107 may be started before finally terminating at an end block 225.

In an embodiment of the present invention, a firmware update protocol may be utilized for over-the-air (OTA) firmware updates. The protocol may specify a set of standard commands and associated parameters, where the standard may be based on the command set of both the SyncML DM protocol and the OMA Generic Content Download OTA Specification. SyncML DM is the leading standards initiative that focuses on remote device management for wireless devices. The OMA Generic Content Download OTA Specification provides a flexible protocol for enabling the download of generic content. In an embodiment of the present invention, by combining elements of these protocols, a protocol may be constructed that provides the ability to use SyncML DM for controlling the main device management functions, and to use the OMA Download protocol to download larger binary objects such as, for example, firmware updates.

Figure 3:
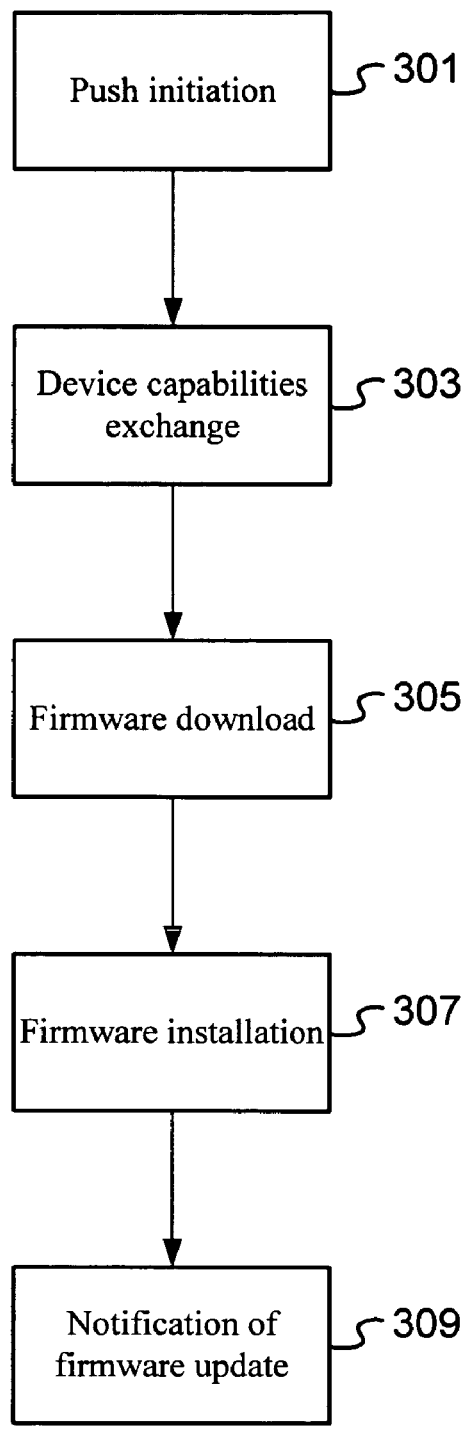
FIG. 3 illustrates a flow diagram of an exemplary process for OTA firmware update, in accordance with an embodiment of the present invention.

FIG. 3 illustrates a flow diagram of an exemplary process for OTA firmware update, in accordance with an embodiment of the present invention. The firmware update may begin with push initiation 301, where a mobile handset such as, for example, mobile handset 107 of FIG. 1 may open a data connection to a server. In an embodiment of the present invention, users may not be expected to proactively check for the existence of firmware updates. Therefore, an electronic device such as, for example, the mobile handset 107 may support a mechanism for remotely initiating a data session. In an embodiment of the present invention, the SyncML DM protocol may provide a framework by which clients (i.e., mobile handsets such as mobile handset 107) may receive a "Notification Initiation Alert" that may trigger the client to start a data session.

For example, the OTA Flash Forum protocol may use General Package#0 as specified in the SyncML DM Notification Initiation Session document. Further details of this aspect of SyncML DM may be found in the document "SyncML Notification Initiated Session, Version 1.1.1", Oct. 2, 2002, by the SyncML Initiative, Ltd., the entire subject matter of which is hereby incorporated herein by reference, in its entirety. SyncML DM may specify that WAP Push may be used for this purpose, and may also specify a format acceptable for the purpose of firmware upgrade initiation. In an embodiment of the present invention, a SyncML DM client or a compatible client may be used for the initiation of the update process to allow use of the SyncML DM Notification specification.

The firmware update process of FIG. 3 may then perform a device capabilities exchange 303, where a minimum set of selection criteria may be sent by the mobile handset to the server, to permit the server to provide the mobile handset with the appropriate firmware update. In an embodiment of the present invention, the minimum set of selection criteria to adequately determine the required update for a mobile handset may, for example, be the model name, the manufacturer name, and the current installed firmware version.

In an embodiment of the present invention, SyncML DM may provide a standardized framework to exchange the selection criteria listed hereinabove. The SyncML DM Standardized Objects document defines a set of mandatory objects that are to be supported by the client and the server. SyncML DM does not mandate that this information be exchanged at the beginning of a management session. However, SyncML DM may require support by both client and server. In an embodiment of the present invention, the SyncML DM specification may be used as the primary means for exchanging device capabilities for the purpose of identifying available firmware updates.

In an embodiment of the present invention, additional parameters may be used to provide more granular selection of firmware updates. For example, the firmware update service may only be provided based on a subscription and therefore a specific device ID may be required. SyncML DM specifies a host of other required objects for the device identifier. These other required objects may be used to provide additional selection criteria.

Referring again to the illustration of FIG. 3, the firmware update may then perform firmware download 305. In an embodiment of the present invention, when dealing with high-volume distribution with large file sizes such as, for example, firmware update packages, it may be best for carriers to reduce the amount of OTA traffic. To provide a more efficient, standardized download mechanism, the Flash Forum protocol may leverage portions of the Open Mobile Alliance Generic Content Download Over The Air Specification.

Figure 4:
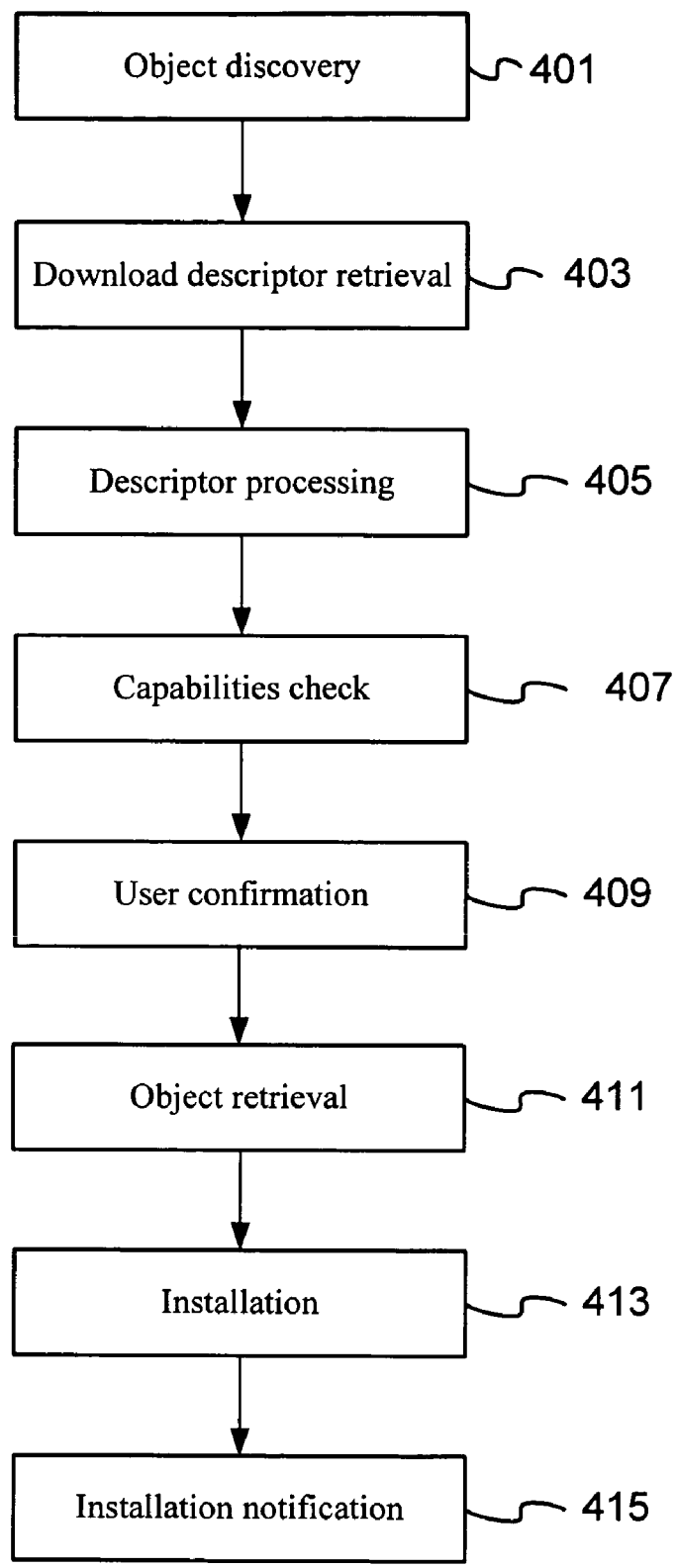
FIG. 4 illustrates a flow diagram of the OMA Download process for downloading generic content to mobile handsets, in accordance with an embodiment of the present invention.

FIG. 4 illustrates a flow diagram of the OMA Download process for downloading generic content to mobile handsets, in accordance with an embodiment of the present invention.

The OMA Download process may begin with object discovery 401. The OMA Download specification suggests several methods for discovery such as, for example, a reference on a Web page, or inside an email or a multimedia messaging service (MMS) message, or storing in memory or in an accessory attached to the phone. The OTA Flash Forum may not assume that end-users will proactively update their phones, without appropriate notification and a seamless user-experience. In an embodiment of the present invention, the SyncML DM protocol may be used for the object discovery 401 as described herein. Based on the push initiation 301 and capabilities exchange 303 performed by SyncML DM as shown in FIG. 3, the appropriate URL may be provided to the OMA Download Agent for the object discovery 401 of FIG. 4.

In an embodiment of the present invention, the firmware update URL may be an object within the SyncML DM management tree. The SyncML DM specification may allow for the EXEC command to be sent using the firmware update URL as the target. This EXEC command may trigger a method to launch the OMA OTA download client.

The OMA download may then perform download descriptor retrieval 403. The device hosting the download agent may support either W-HTTP or WSP, and may support WAPTLS or WTLS, as well as other protocols. The download descriptor may be sent using other mechanisms such as MMS, email, or an instant messaging protocol. Based on the URL received from the SyncML DM session, the OMA-compliant download agent may download the download descriptor with the necessary parameters. In an embodiment of the present invention, the necessary parameters may be sent as part of the HTTP GET request URL, or as part of HTTP header.

The OMA download may then perform download descriptor processing 405. The download descriptor may provide information about the firmware update, device requirements, and may also contain a URI to the delivery server for the actual download of update packages.

The OMA download may then perform the capabilities check 407. The download agent may use the information in the descriptor such as, for example, size and type, to check whether the mobile handset may be capable of using the firmware update object. This may prevent downloading of firmware update objects that will not work properly. The download agent may use the size attribute of the download descriptor to check whether the device may be capable of using or installing the update package. If the update package cannot be installed due to lack of memory, an "insufficient memory" status may be posted to the server and the end-user may be notified.

The OMA download may then provide user confirmation 409. Information from the download descriptor may be made available to the user, if available, to accept or reject the download. The download descriptor may include such information as, for example, the name, vendor, size, type, and description. In an embodiment of the present invention, if the user does not approve the downloading, the OMA Download Agent may post a "User Cancelled" status report to the server. The user confirmation may be utilized for enabling the download. In an embodiment of the present invention, additional confirmation may also be employed to conduct subsequent operations such as, for example, firmware updates.

The retrieval of the firmware update object 411 may be performed using HTTP (or HTTPS), and may be performed according to the scheme indicated by the ObjectURI attribute of the download descriptor. The OMA Download Agent may invoke the URL in the objectURI element of the download descriptor to request the update package. This URL may point to the delivery server and may contain mandatory parameters and optional parameters.

In an embodiment of the present invention, the download agent may request a chunk of the update package binary by specifying a byte range in the request header to allow devices with limited available RAM to handle larger update downloads. The server may then respond back with the update package binary chunk of the requested range, and the response HTTP header may contain the information of the bytes being sent. In an embodiment of the present invention, there may be a content-range header indicating the byte range being sent, and a content-length header indicating the actual number of bytes being sent. If the last byte position is not greater than or equal to the first byte position, the requested header may be considered syntactically incorrect and the server may ignore it and the entire update package may be sent. If the last byte position is greater than the length of the update package binary it may be set to the one less than the length of the update package binary.

The OMA download process may then perform installation 413 of the update. The OMA Download Specification indicates that installation is complete when the downloaded object has been prepared for execution/rendering on the device, or an unrecoverable failure has occurred. This model may be followed for firmware updates. In an embodiment of the present invention, a successful download may imply installation, for the purpose of notifying the OMA compliant download server. A successful download may not necessarily mean that the firmware has been updated successfully, only that the update was successfully downloaded.

Installation notification 415 may then follow. If the installNotifyURI attribute in the download descriptor has been explicitly used, the OMA Download Agent may relay the status of the installation back to the OMA Download Server via the installNotifyURI. For firmware upgrades, this may only imply that the firmware update has been successfully downloaded. It may not necessarily mean that the firmware update has been processed.

Referring back to the process for OTA firmware update of FIG. 3, following firmware download 305, firmware installation 307 may be performed. In an embodiment of the present invention, for firmware update installation, a mechanism may exist in the mobile handset that may provide the location of the downloaded firmware update. This mechanism may be, for example, a device management tree object on which an EXEC command will trigger the update mechanism. The firmware update location may be in a location accessible by a non-SyncML DM client. In an embodiment of the present invention, the mobile handset may provide the end-user with a prompt as to whether or not to proceed with the firmware update installation. If the user accepts the installation, the firmware update may be processed. If the user rejects the installation, the process may terminate without updating the firmware.

In an embodiment of the present invention, updating the firmware may involve the mobile handset becoming inoperable during the time of the firmware update. In an embodiment of the present invention, if an interruption of the firmware update occurs, the update process may not be capable of immediately returning the device to a normal operating condition. In the case that the device cannot immediately return to normal operating condition, the end-user may be presented with a warning that the phone will be offline and the approximate time of the update, prior to beginning the firmware installation.

Upon completion of the firmware update process, the mobile handset may send to the server a notification of the resulting status of the firmware update 309. In an embodiment of the present invention, for non-fatal update failures, the end-user may be provided with an indication of the failure and return the mobile handset to an operational mode. The mobile handset may send a notification to the SyncML DM compliant server that the update failed to install. Some non-fatal reasons for failure of a firmware update may be, for example, user rejection, corrupted update package, wrong update package, or failed signature authentication.

Upon completion of a successful firmware update, the end-user may be provided with an indication that the firmware was successfully updated. The mobile handset may send a notification to the SyncML DM compliant server that the update was successful.

In an embodiment of the present invention, the notification may use either a data channel or out-of-band channel such as, for example, short message service (SMS). In the case of SyncML DM, the device may provide the new firmware version to the SyncML DM compliant server using the objects DevInfo and DevDetail as required management objects supported by the client and server. DevInfo may, for example, include the following SyncML DM objects: Man (manufacturer identifier) and Mod (Model identifier). These objects may be sent at the beginning of every management session. SyncML DM may also require support for the FwV (Firmware version) object under DevDetail. In an embodiment of the present invention, for SMS notification, the device may support mobile originated SMS. Using SMS may provide reduced network congestion.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An electronic device that employs a first protocol to interact with a first server to determine the existence of updating information for updating the electronic device and to receive a schedule of one or more times at which the electronic device is to communicatively couple to the first server to download the updating information, and employs a second protocol to initiate download of the updating information from a second server according to the scheduled one or more times, if the first server indicates the existence of the updating information in the second server.

2. The electronic device according to claim 1 wherein the first server comprises a management server.

3. The electronic device according to claim 1 wherein the electronic device communicates device information to the first server, and receives from the first server information identifying a second protocol and a remote reference to employ for the download of updating information.

4. The electronic device according to claim 3 wherein the electronic device communicates to the first server the device information and an indication of a download protocol supported by the electronic device as the second protocol.

5. The electronic device according to claim 3 wherein the electronic device employs a first protocol to communicate the device information to the first server and in response, downloads the updating information from the first server employing the first protocol.

* * * * *